United States Patent [19]

Dykema

[11] Patent Number: 4,673,170
[45] Date of Patent: Jun. 16, 1987

[54] CONSTANT SPRING FORCE MECHANISM

[76] Inventor: Owen W. Dykema, 23429 Welby Way, Canoga Park, Calif. 91307

[21] Appl. No.: 659,383

[22] Filed: Oct. 10, 1984

Related U.S. Application Data

[63] Continuation-in-part of Ser. No. 367,509, Apr. 4, 1982, Pat. No. 4,476,969.

[51] Int. Cl.$^4$ ............................................. F16F 3/02
[52] U.S. Cl. ................................... 267/174; 188/380
[58] Field of Search ............... 188/380; 248/585, 586, 248/591, 593, 595, 620; 267/169, 171, 174, 178

[56] References Cited

U.S. PATENT DOCUMENTS 807,314  12/1905  Pepple ................................. 248/595

FOREIGN PATENT DOCUMENTS 2418721  9/1979  France ................................. 248/591

Primary Examiner—Duane A. Reger
Attorney, Agent, or Firm—Jessup, Beecher & Slehofer

[57] ABSTRACT

The mechanism is used to dampen the recoil or kickback effects of a machine, such as a machine gun, jack hammer, or the like which generates short duration, high-amplitude unidirectional forces. The mechanism includes an ancillary mass interposed between the base and the recoil mass. A relatively stiff spring is engaged at one end to the recoil mass, which is in contact with the ancillary mass at the other end only over part of the recoil cycle. A constant force spring mechanism is interposed between the ancillary mass and the base and is engaged at one end to the base and may be engaged to the ancillary mass at the other end. The mechanism prevents motion of the recoil mass and reduces the maximum recoil force transmitted to the base by transferring the original short-duration, high-amplitude recoil driving force impulse first to the ancillary mass, in the form of momentum of the ancillary mass, and subsequently to the base as a longer duration, lower amplitude recoil force. A trigger latch can be used to cock into position the ancillary mass and the compressed constant force spring mechanism. When the trigger is pulled, the ancillary mass is accelerated towards the stiff spring. The two are in contact during the period of the recoil driving force, with almost no net motion of the recoil mass.

2 Claims, 13 Drawing Figures

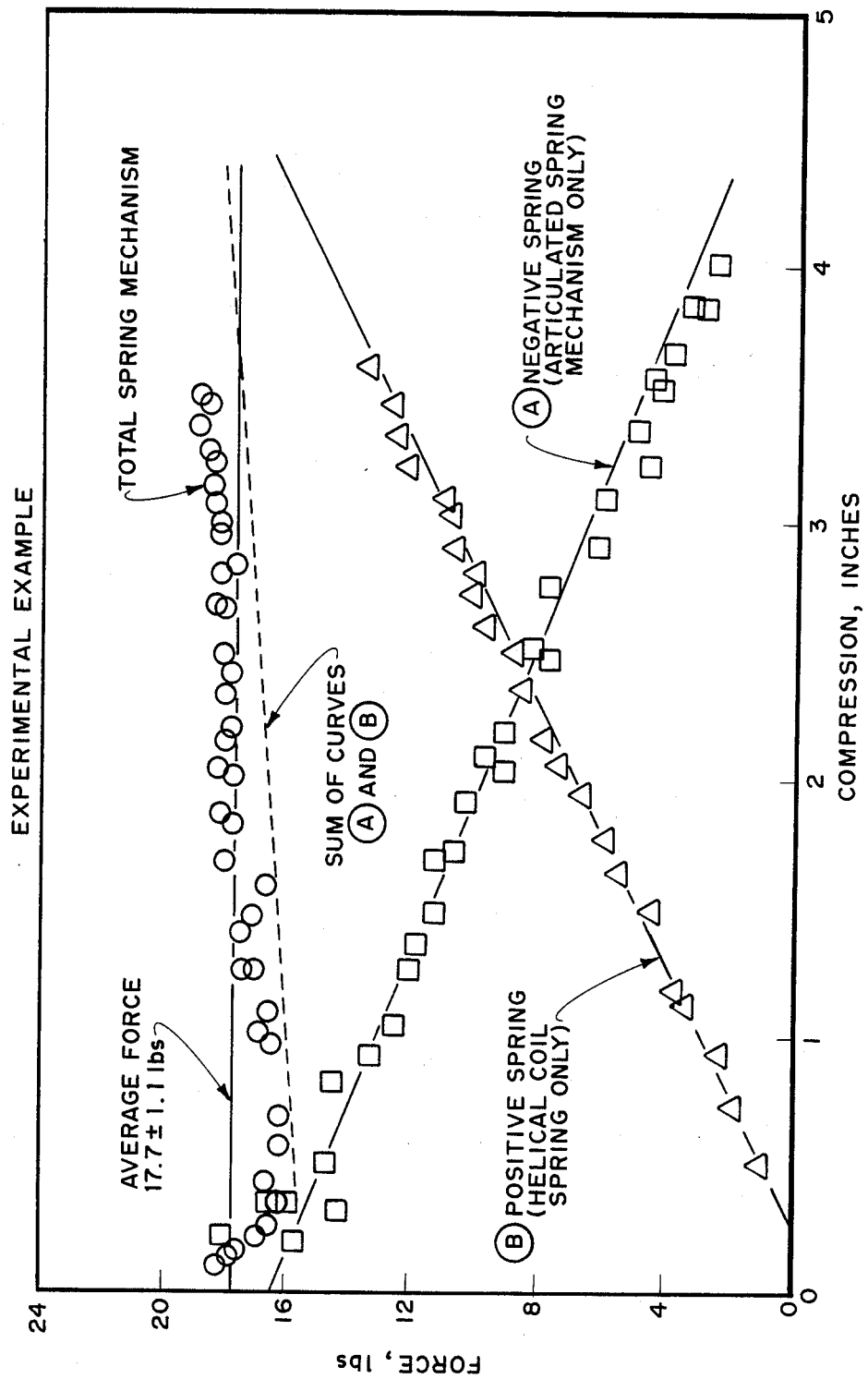

CONSTANT SPRING FORCE MECHANISM

RELATED U.S. APPLICATION DATA

This is a continuation-in-part of Ser. No. 367,509, filed on Apr. 4, 1982 now U.S. Pat. No. 4,476,969.

BACKGROUND OF THE INVENTION

Prior art in the area of firearms is of a single type, that of a shock absorber. Operation of a gun shock-absorbing system requires that all or part of the gun move, in response to the recoil force. That part of the gun that moves is then decelerated, as slowly as possible, by the shock-absorbing system. Normally the shock absorber is some form of a spring-damping system interposed between the gun and its supporting structure. Its function is primarily to reduce the maximum amplitude and the shock-like characteristics of the force transmitted to the supporting structure. For example, in the case of a pistol, Proter (U.S. Pat. No. 2,522,192) shows that a slider moves rearward, in response to the recoil force, and is decelerated by a spring between the slider and the butt of the pistol. In Mathiew (U.S. Pat. No. 2,731,753), a rifle moves rearward and is decelerated by springs contained in the stock, which compress against the shooter's shoulder. In Nasypany (U.S. Pat. No. 4,088,057), part of the recoil force is directly transmitted, by gun motion, to the shooter's shoulder while a part is transferred to an auxiliary mass. This auxiliary mass is accelerated rearward by a portion of the gun gases and, in turn, is slowly decelerated by the spring-like action of the compressibility of a trapped gas. In Edwards (U.S. Pat. No. 4,279,091), the rearward motion of the gun compresses a spring, in the stock of the gun, which, in turn, initiates rearward motion of an auxiliary mass. The rearward motion of the auxiliary mass is then slowly decelerated by a second spring.

These inventions are all variations on the simple and well-known shock absorber. Shock absorbers have been in use with machine guns since World War II. In the application of this invention to firearms, however, it is an objective of the invention to reduce gun motion as nearly as possible to zero. With no gun motion, a simple shock absorber does not function. Thus, prior art in the area of firearms (i.e., shock absorbers) does not teach the art disclosed in this invention.

There is also related prior art in the area of vibration isolation and damping, related to various commercial applications. Some of the prior art in this area again involves the shock absorber concept. For example, Karnopp (U.S. Pat. No. 3,807,678) shows a simple spring-damping system (in which the magnitude of the damping can be controlled), used to minimize transmission of a vibration (a motion of a mass) from the mass to its supporting structure. Again the mass must be in motion for the spring-damping system to perform its function. A vibration, however, can usually be described as a sinusoidal motion, predominantly at a single frequency. The spring-mass-damping system must then be tuned, as in Karnopp, to be anti-resonant at the vibration driving frequency. As in the prior art related to firearms, a vibration damping system such as that shown by Karnopp exerts no balancing forces, in fact does not function, unless there is relative motion between the primary mass and its supporting structure. This art, therefore, also does not teach the art disclosed in this invention.

Finally, a second type of vibration isolator shown in the prior art is the so-called dynamic damper. Such a system was first analyzed by Ormondroyd and Den Hartog in 1928 (Reference 1) and applications of the dynamic damper appear in the prior art in for example, Settles (U.S. Pat. No. 2,875,731) and in Flannelly (U.S. Pat. No. 3,322,379) in 1959 and 1967, respectively. Detailed analysis of dynamic dampers are shown in textbooks on structural vibrations, for example, in Timoshenko (Reference 2), as early as 1928. The major difference between the dynamic damper and the more common shock absorber approach to vibration isolation is that the dynamic damper reduces transmission of vibrations by reducing the vibration, or motion, of the vibration source. If there is no vibration of the primary mass, no vibration can be transmitted to its supporting structure. In a dynamic damper the forces which cause vibration are transferred to an auxiliary spring-mass system. The auxiliary mass then performs strong vibrations but, since motion of the primary mass has been virtually eliminated, little or no vibration is transmitted to the main support structure.

FIG. 1 shows a schematic of a simple dynamic damper, an example taken from Reference 2. In this example, the rotating motor is assumed to be unbalanced, and transmits a sinusoidal force to the beam (supporting structure) which supports the motor, at the frequency of rotation of the motor. In this application the auxiliary spring-mass system is tuned to the frequency of the driving force, the motor rotational speed. The auxiliary mass performs strong displacement oscillations while the motor and its supporting beam remain virtually motionless. The analysis of the system shown in FIG. 1, from Reference 2, shows that the motion of the system can be represented by two simultaneous second-order differential equations, involving two degrees of freedom. The analysis also shows that there is indeed a solution for this system in which the source of the oscillatory driving force (the motor) and its supporting structure (the beam) remain virtually motionless.

As clearly pointed out in Settles (U.S. Pat. No. 2,875,731) the dynamic damper works because the auxiliary mass move at the same frequency as the driving force, with a phase lag of 180°, and provides an auxiliary force which is at all times of equal magnitude to, but in the opposite direction from, the driving force. Thus, the driving force is at all times exactly cancelled out and there is no net force remaining to cause motion in the vibration source. However, such a dynamic damper cannot be built to provide this continuous force cancellation if the driving force-time characteristic is significantly different from sinusoidal. A fundamental characteristic of a simple spring-mass system attached to a support is a varying force on the support which is sinusoidal in character, at a single frequency. If a driving force is not sinusoidal, and therefore can be represented by the sum of a number of sinusoidal oscillations at different frequencies (a Fourier representation), then a simple spring-mass system, a dynamic damper, cannot be designed to exactly, or even approximately, cancel out the driving force at all times. A dynamic damper can be designed to cancel out vibrations at one of these frequencies, but vibrations at all other frequencies will remain.

A unidirectional, impulse-type driving force, such as is generated in firing a gun, or in the contact of a jack hammer or sand tamper tool with the ground, is the most extreme example of this mismatch. FIGS. 2 and 3 show example force-time traces of a dynamic damper applied to a sinusoidal driving force (FIG. 2) and to a unidirectional, impulse-type force (FIG. 3). FIG. 2 shows the force generated by the dynamic damper at all times of equal magnitude to, and 180° out of phase from, the driving force, with the result that the net force is at all times equal to zero. FIG. 3, however, shows that the force generated by the dynamic damper can, during the period of the impulse, exactly cancel out the driving force, but at all other times the dynamic damper continues to provide a sinusoidal force which is unopposed by the driving force. Particularly because the spring-mass system of the dynamic damper provides both positive and negative forces at its attachment point, a simple spring-mass system cannot be designed to provide a force-time characteristic to match, and oppose, a driving force which is only positive (or negative).

Thus, the prior art related to vibration isolation systems employing the principle of the dynamic damper do not teach methods appropriate to damping, or isolating, non-sinusoidal or impulse-type driving forces. In general, then, none of the prior art in any related field teaches the principles disclosed in this invention.

SUMMARY OF THE INVENTION

The dynamic recoil damping device finds application wherever a strong kickback or recoil effect is found when using various machines, such as a rifle, pistol, machine gun, jack hammer, sand tamper, or the like. The oft-quoted principle of physics which states that for every action there is an opposite and equal reaction is quite apparent in the recoil effects of a rifle. The recoil effect is simply a result of a sudden rapid discharge of a bullet being expelled from a rifle at a very high muzzle velocity. The recoil force against the shooter is quite sudden and shock-like. Control of the multiple recoil or kickback effects in high-caliber machine guns is an even more difficult problem.

The recoil force will always be there whenever a gun is operated. The purpose of this invention is to transfer the recoil force to an ancillary mass and soft spring which will then subsequently dissipate the force over a longer period of time.

The device consists of a soft spring, a stiff spring and an ancillary mass which are placed between a base, or gun mount, and the recoil mass itself, such as a gun. The stiff spring is attached only to the gun. The soft spring is attached to the base at one end and may be attached to the ancillary mass on its other end. The ancillary mass is much lighter than the gun mass and can be adapted to meet the specific applications. The ancillary mass/soft spring combination is "cocked" by compressing this combination against the base and using a trigger latch to keep the soft spring compressed. When the combination is released and is coordinated correctly with the discharge of the recoil mass, the soft spring will propel the ancillary mass towards the gun mass. At the instant of firing, the ancillary mass will be in contact with the stiff spring, providing a force to oppose that of the gun and prevent gun recoil. The ancillary mass will then rebound back towards the gun base. The rebound will cause the soft spring to compress again and, as a result, the ancillary mass begins reciprocating.

The face of the stiff spring which meets with the ancillary mass can have a contact plate to more effectively transfer the recoil force to the ancillary mass. Other features which can be included with the basic components to provide a more useful and practical system include means for damping the ancillary mass and soft spring to stabilize the reciprocation of the ancillary mass/soft spring combination. This damping means could be a dash pot.

A further modification could include a simple shock absorber system placed between the base or gun mount and the gun or recoil mass. The shock absorber system is placed adjacent to and in parallel with the dynamic recoil damping device. The purpose of this shock absorber system is to return the gun to the firing position between rounds if the net gun motion during firing is not exactly zero. In other words, if there does happen to be some recoil movement of the gun after it has been fired, then the shock absorber system will return the gun to its correct rest position before the next firing.

This invention could be applied to control of the shock-like forces associated with contact of the tool of a pneumatic air hammer with the ground, or the like, since short-duration, high-amplitude unidirectional forces are also encountered in this type of tool.

Another subcombination in this invention replaces the relatively soft spring just described. The subcombination is a constant force spring mechanism having central coil spring with a plate at both ends. The two places have four articulated arms connecting each corner of the plates. The arms have extension springs for resisting the compression of the central spring. The mechanism is discussed in greater detail under *DESCRIPTION OF THE CONSTANT FORCE SPRING MECHANISM*, infra.

BRIEF DESCRIPTION OF THE DRAWINGS

FIG. 13 is a graphic illustration of an experimental example of the Constant Force Spring Mechanism disclosed in FIGS. 11 and 12. The data plotted is the relationship between force and compression of the negative spring, the positive spring, and the total mechanism.

DETAILED DESCRIPTION OF THE PREFERRED EMBODIMENT

Figure 1:
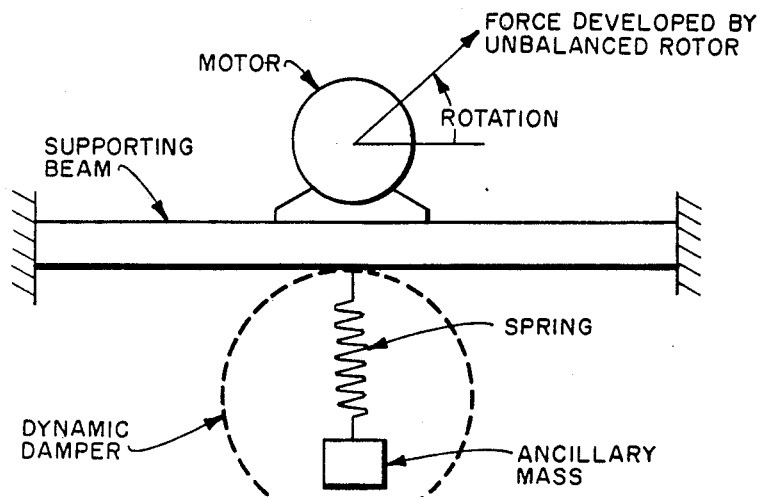
FIG. 1 is a schematic of the classical dynamic damper.
Figure 2:
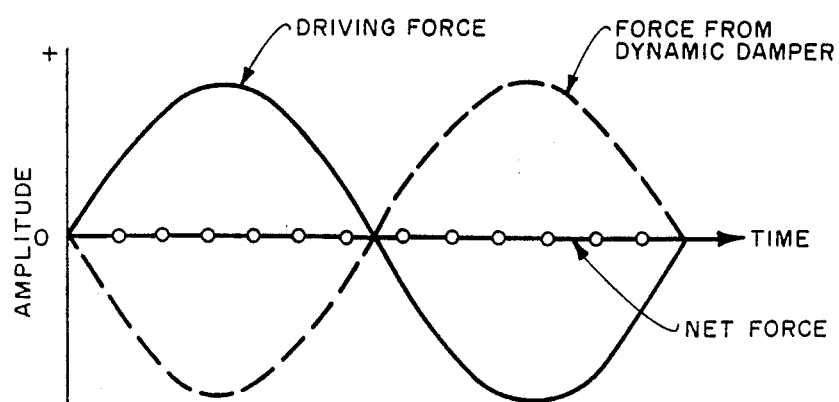
FIG. 2 is a graphic illustration showing the force-time of a dynamic damper applied to a sinusoidal driving force.
Figure 3:
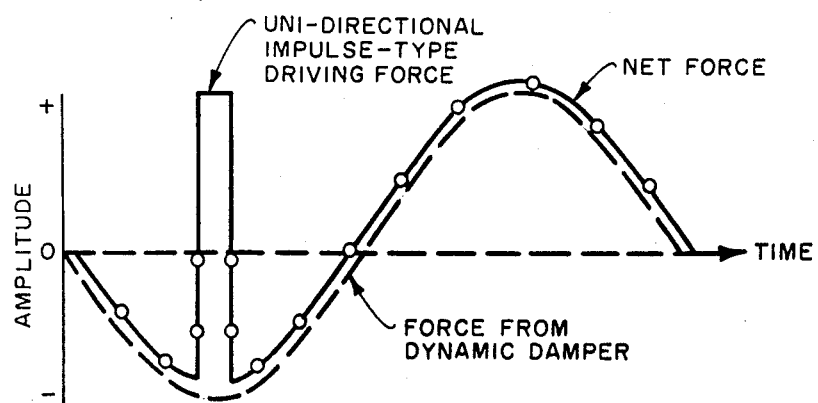
FIG. 3 is a graphic illustration of a force-time trace of a dynamic damper applied to a unidirectional, impulse-type force.

The preferred application of this invention is to devices which develop driving forces which are unidirectional (always positive or negative) and are of impulse or shock-like character (high-force amplitude over a short period of time). The specific objectives of the device of this invention are to neutralize this driving force and to minimize the magnitude and shock-like character of the force subsequently transmitted to the supporting structure. Examples of systems which develop such forces are firearms, in particular machine guns, and reciprocating industrial tools, such as jack hammers and sand tampers. Other applications will be apparent to those familiar with the art. The machine gun application will be used here as the example discussed in detail.

Since a machine gun recoil force is the result of rapid acceleration of a mass (a bullet) out of the barrel, the recoil force is of high amplitude and short duration. Unless a mass is ejected from the gun in the direction opposite to the bullet, with equal energy, the recoil force is unidirectional, and must be opposed, in some manner, by the supporting structure.

To achieve one of the objectives of this invention, to cause the gun to "stand still" during firing, an auxiliary force must be generated which, as nearly as possible, is equal in magnitude to, and opposite in direction from, the recoil force at all times during the period of the recoil force. A recoil force can be approximately represented by a square wave, a constant force over a short period of time. It is difficult to conceive of a simple, passive auxiliary system which can develop an equal and opposite square-wave force. However, a half-cycle of a sinusoidal oscillation, wherein the period of this half-cycle is approximately equal to the recoil period, can represent an adequate opposing force for most applications. Such a half-cycle sinusoidal opposing force can be provided by an ancillary spring-mass system which is in contact with the gun only over a period approximately equal to the duration of the recoil force (see FIG. 10). With proper and controlled timing, the ancillary mass (travelling forward) can be made to contact the gun at the beginning of the gun recoil period and (now travelling rearward) to break contact with the gun at the end of this period. If the total change in momentum of the ancillary mass during this period is equal to the recoil impulse, then the gun momentum will be the same after contact, and firing, as before. If the gun was motionless prior to contact, it may perform some small motion during the interchange of forces between the gun and the ancillary mass, because of an imperfect force-time match, but will again be virtually motionless after contact is broken. In effect, the recoil force is wholly transmitted to the ancillary mass, leaving no residual, net force to cause motion of the gun.

Since the recoil period is short, the frequency equivalent to the period when the ancillary mass is in contact with the gun must be very high. This means that the ratio of the force-deflection characteristic, the spring constant, of the spring interface between the ancillary mass and the gun, while the two are in contact, to the mass of the ancillary mass must be high.

While the force interchange between the gun and the ancillary mass leaves the gun virtually motionless, the recoil energy has been transferred to the ancillary mass and soft spring. The ancillary mass, after contact with the gun, is now travelling rearward and must be decelerated. To avoid applying a strong rearward force to the gun, the ancillary mass must now have no contact with the gun. A relatively soft spring, interfacing between the ancillary mass and the gun mount, must now act on the ancillary mass, to provide the force necessary to stop, and to reverse, the rearward motion of the ancillary mass. The force exerted on the gun mount, then, is the force from this relatively soft spring. Neglecting damping, the integral of the force-time impulse applied to the ancillary mass by the gun recoil driving force, in preventing gun motion, while the ancillary mass reverses its direction of travel, must now be cancelled by an equal force-time integral applied to the ancillary mass by the soft spring in again reversing the direction of travel of the ancillary mass. Thus, the integral over time of the force exerted on the gun mount by the soft spring must be equal to the integral over time of the gun recoil force. The longer the period of time over which the ancillary mass is decelerated and re-accelerated (forward) by the soft spring, the lower is the maximum force exerted on the gun mount and the less shock-like is the force-time characteristic on this structure. Thus the ratio of the force-deflection characteristic, the spring constant, of the soft spring interfacing between the ancillary mass and the gun mount, to the mass of the ancillary mass should be as small as practical (the frequency as low as practical). Ideally, if the force-time characteristic against the supporting structure could be made a square-wave, then the force would be both constant in time and a minimum. In a machine gun, the maximum time over which the auxiliary mass can be decelerated and re-accelerated is limited by, and is nearly equal to, the time between rounds.

Figure 10:
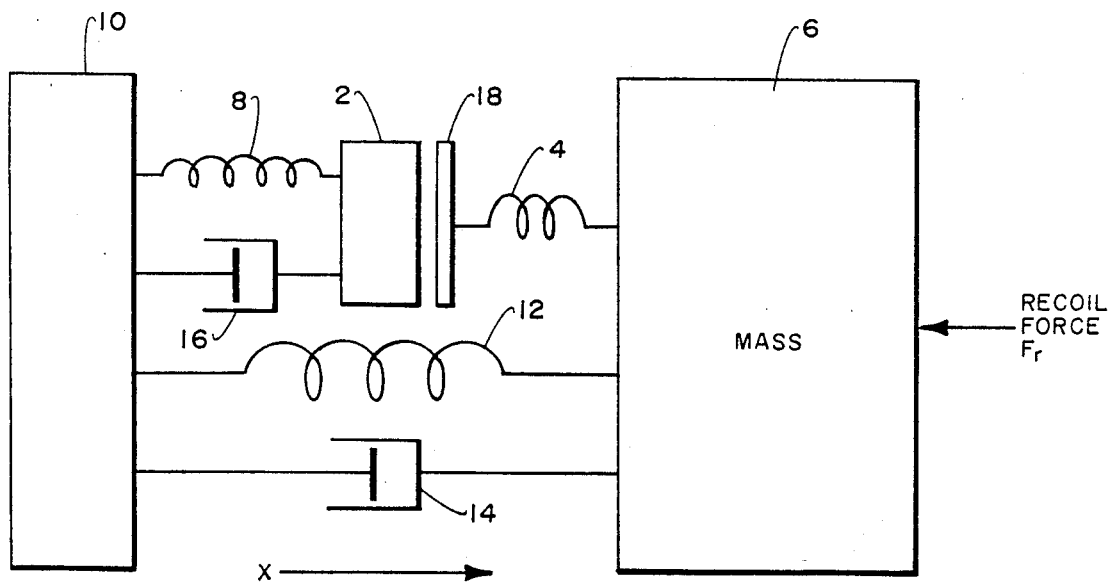
FIG. 10 is a schematic diagram showing the general dynamic recoil damping device and the added feature of the shock-absorbing system.

FIG. 10 shows a schematic of the system described above, with modifications necessary for practical application of the principles of this invention. The basic embodiment of this invention is shown in FIG. 10 as the ancillary mass 2, the stiff spring 4, interfacing between the ancillary mass 2 and the recoil or gun mass 6, and the soft spring 8, interfacing between the ancillary mass 2 and the base or gun mount 10. Other features to provide a more practical system are:

1. A simple shock absorber system, shown as spring 12 and a second damper 14 (dashpot), connects the gun mass 6 directly to the gun mount 10. This is provided primarily to return the gun to the firing position between rounds in case the (small) net gun motion during firing is not exactly zero. This system also serves as a backup to protect against misfires and failure of the main recoil damping system.

2. Soft spring 8 is shown permanently attached to the ancillary mass 2. This modification simplifies the construction and operation of the recoil damping system. Since the soft spring 8 constant is much lower than that of the stiff spring 4, this permanent connection has little effect on the ancillary mass 2 dynamic behavior when in contact with the stiff spring.

3. First damper 16 (dashpot) is provided between the ancillary mass 2 and gun mount (base) 10. This is required as a trim control, as necessary, to assure exactly repeated dynamic behavior of the recoil damping system over many cycles. Ideally, no damping would be required anywhere in the system shown in FIG. 10. The modifications cited above are not strictly necessary to performance of the recoil damping device which is the subject of this invention.

FIG. 10 shows the system at rest, with no compression or tension stresses in any of the springs and no motion of any of the masses. The positive X-coordinate is in the forward direction relative to the gun, and the zero positions of the ancillary mass 2 and gun or recoil mass 6 are selected as their rest positions.

The equations of motion can be written for the ancillary and the gun masses. The result is a pair of simultaneous second-order differential equations. Using a conventional compression spring between mount 10 and ancillary mass 2, these equations are:

$$\ddot{X}_1 + \frac{d_1}{m_1}\dot{X}_1 + \frac{k_1 + k_2}{m_1}X_1 - \frac{k_2}{m_1}X_2 = -\frac{F_r}{m_1} \quad (1)$$

$$\ddot{X}_2 + \frac{d_3}{m_2}\dot{X}_2 + \frac{k_2 + k_3}{m_2}X_2 - \frac{k_2}{m_2}X_1 = 0 \quad (2)$$

Where:
X = displacement
$\dot{X}$ = velocity
$\ddot{X}$ = acceleration
$m_1$ = recoil mass 6
$m_2$ = ancillary mass 2
$k_1$ = spring constant of spring 12
$k_2$ = spring constant of stiff spring 4
$k_3$ = spring constant of soft spring 8
$d_1$ = damping constant of second damper 14
$d_3$ = damping constant of first damper 16
$F_r$ = periodic, unidirectional force Using the constant force spring mechanism of this invention between mount 10 and ancillary mass 2, equation (1) remains the same but equation (2) becomes:

$$\ddot{X}_2 + \frac{d_3}{m_2}\dot{X}_2 + \frac{k_2}{m_2}X_2 - \frac{k_2}{m_2}X_1 = \frac{F_m}{m_2} \quad (2A)$$

Where:
$F_m$ = the constant force from the constant force spring mechanism of this invention Several other configurations of the spring mechanism of this invention, relative to mass 2, are possible. Equation (2A) represents a basic configuration wherein the spring mechanism provides a constant force to mass 2 regardless of the position of mass 2.

Equations (1) and (2) correctly describe the motion of masses 2 and 6 only when mass 2 is in contact, via the massless contact plate 18, with spring 4 and the gun 6 is in the process of firing. When the gun 6 is not firing, recoil force $F_r$, in equation (1) is zero and when mass 2 is not in contact with stiff spring 4, the correct equations of motion can be derived from equations (1) and (2) by setting the spring constant $k_2$ of stiff spring 4 equal to zero.

Thus, the equations describing the motion of the masses 6 (gun) and 2 (ancillary) are not only complex, simultaneous second-order differential equations, with two degrees of freedom, but they are not continuous in time. The equations of motion, therefore, were set up for numerical solution on a computer, using an M-60 machine gun as a typical example application. Initially the gun 6 was assumed motionless in its rest position, with no forces in spring 12 or in stiff spring 4. The ancillary mass was assumed held (no velocity or acceleration) in a ready, or cocked position, away from contact with stiff spring 4, and with soft spring 8 compressed. At time zero, the ancillary mass 2 was released. At each time slice the accelerations of the two masses were calculated, from the forces being exerted on them at that time. These accelerations were then used to predict the new locations and velocities of the masses a small increment of time later. This calculation procedure was continued, resulting in full description of the time-varying displacements, velocities and accelerations of both masses and of the forces exerted on the masses and on the supporting structure. Equations (1) and (2) were changed when mass 2 was not in contact with stiff spring 4 and when the gun 6 was not firing. Variable increments of time were used in the calculation and these intervals were reduced until further reduction was seen to have negligible effect on the solution.

Figure 4:
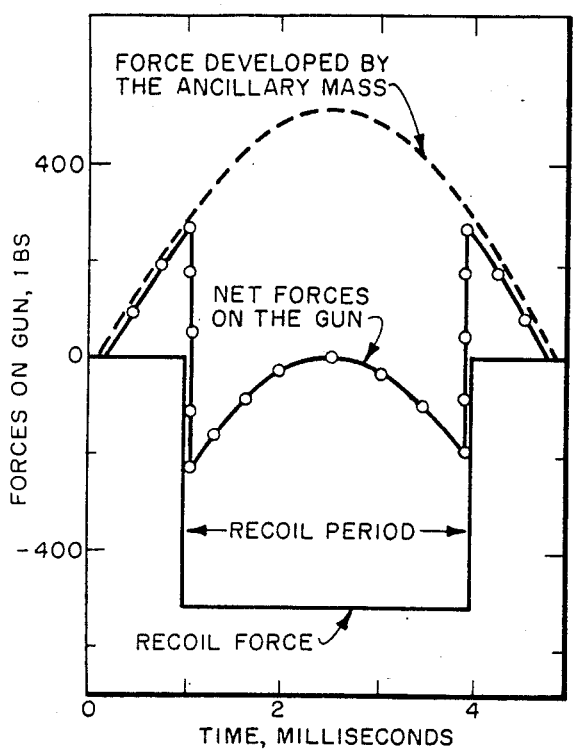
FIG. 4 is a graphic illustration showing an example of the forces on a gun during the period when the ancillary mass is in contact with the stiff spring.

FIG. 4 shows the forces on the example gun during the period when ancillary mass 2 was in contact with stiff spring 4. The figure shows build-up of a positive force on the gun 6 as the ancillary mass 2 contacts stiff spring 4 and begins to compress it. At 1.0 milliseconds the gun begins to fire. The net force on the gun becomes negative, but the decelerating ancillary mass 2 continues to build a positive force. At 2.5 milliseconds, ancillary mass 2 has reached its maximum positive displacement and the net forces on the gun are zero. Ancillary mass 2 then begins to accelerate rearward and the net negative force on the gun again begins to build. At 4.0 milliseconds, before ancillary mass 2 has broken contact with stiff spring 4, the gun recoil force is over and the net force on the gun 6 again becomes positive, decreasing to zero at 4.9 milliseconds as ancillary mass 2 breaks contact with stiff spring 4. The integral of the net force on the gun 6 over the total contact period is essentially zero and, as ancillary mass 2 breaks contact with stiff spring 4, the residual gun motion is essentially zero.

Figure 5:
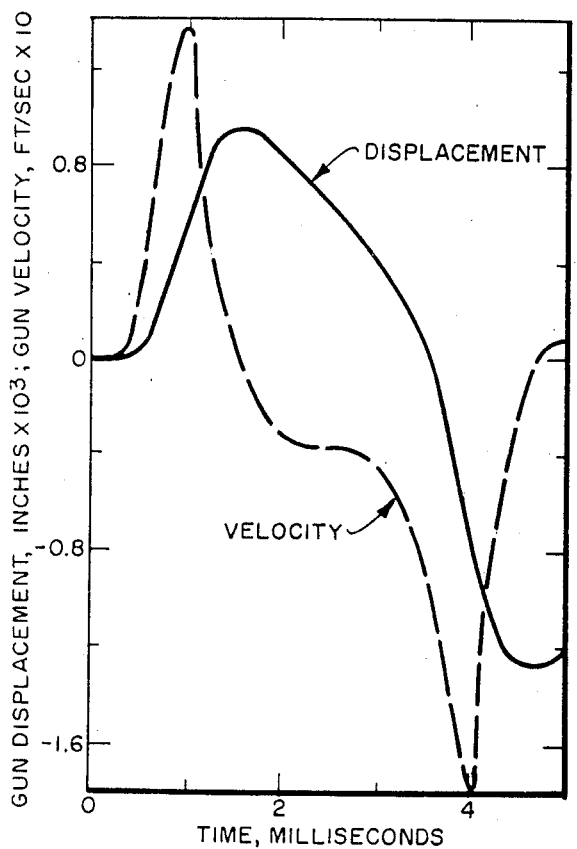
FIG. 5 is a graphic illustration showing the velocity and displacement of the example gun over the contact period of the ancillary mass.

FIG. 5 shows the velocity and displacement of the gun 6 over the contact period. The figure shows that the gun begins to move forward (positive velocity and displacement) under the driving force of the ancillary mass 2 until, at 1.0 ms, the gun begins to fire. The gun 6 then begins to move rearward, driven by the net negative force on the gun, until the gun firing period ends, at 4.0 ms. The gun 6 velocity then drops to near zero, decelerated by the force from the accelerating ancillary mass, until the ancillary mass 2 breaks contact, at 4.9 ms. In the particular case shown, total gun motion, over the entire period between rounds, is minimized by leaving the gun, at the time when the ancillary mass 4 breaks contact, with a small rearward displacement (a little over one-thousandth of an inch) and a small forward velocity (about 0.01 feet per second). The shock absorber system then most easily eases the gun into position for the next round.

Figure 6:
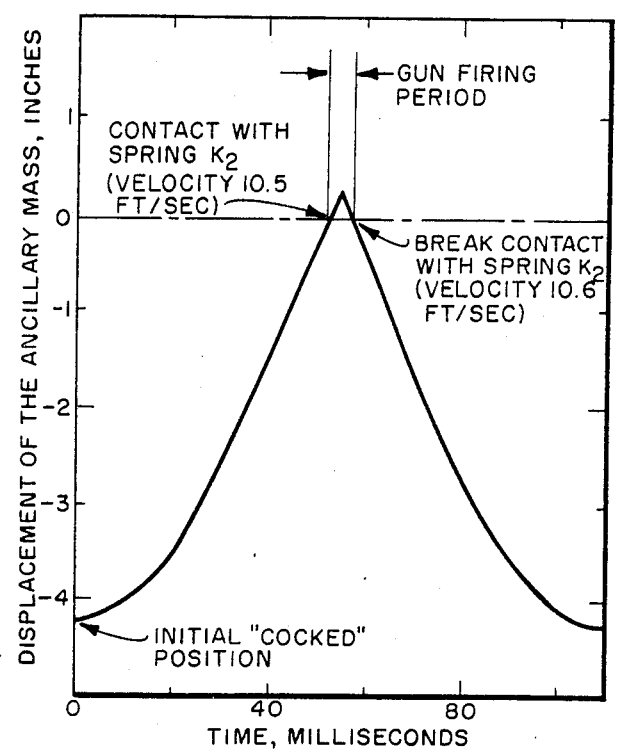
FIG. 6 is a graph showing the motion of the ancillary mass over the entire period between rounds being fired in the example gun.

FIG. 6 shows the motion of the ancillary mass 2 over the entire period between rounds. The figure shows that nearly all of the 109 ms, the period between rounds (550 rounds/minute) is occupied by the low frequency motion of the ancillary mass 2 when not in contact with the stiff spring 4. The period of time when the ancillary mass 2 is in contact with stiff spring 4 represents only about four percent of the period between rounds. It is apparent, therefore, that timing between the oscillations of the ancillary mass and gun firing is very important to proper operation of the recoil damping system. If the gun-recoil system were started by the initial round firing, the system would eventually achieve compatible timing, resulting in best performance. However, the adjustment process might require a number of rounds, during which gun motion would be excessive and loads on the gun mount high. The motion of masses described by equations of motion, such as equations (1) and (2), is so complex that often, unless the system is properly started, the desired motion will not be achieved within a practical number of cycles. For optimum system performance, therefore, it is best to start the system with the ancillary mass 2 "cocked", at the optimum rearward position, and to allow the recoil system to fire the gun, at the proper time. In this manner the system is initiated and maintained in the optimum time phasing.

Figure 7:
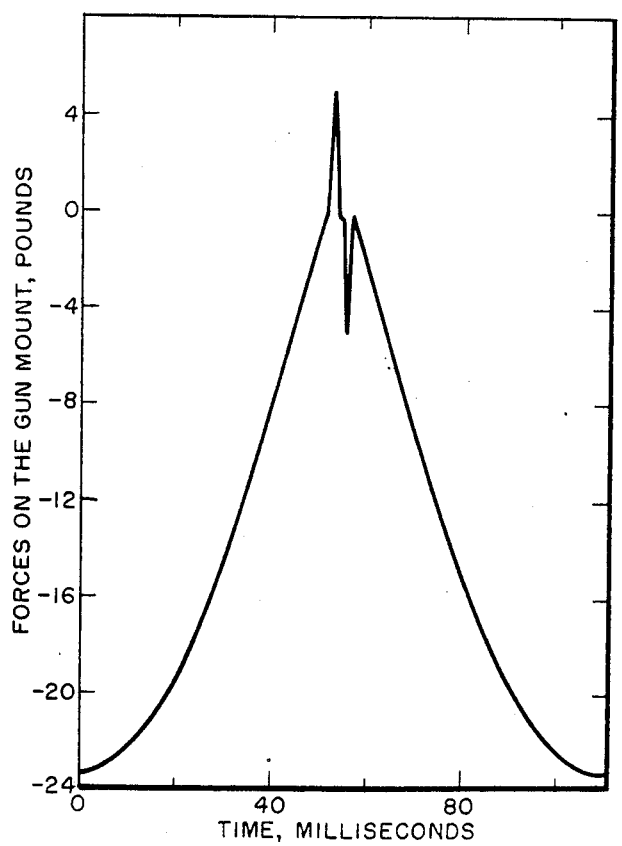
FIG. 7 is a graphic illustration showing the loads exerted on the base or gun mount of the example gun over the period of one cycle.

FIG. 7 shows the loads exerted on the gun mount over the period of the initial cycle, Time 0 begins with the gun in the cocked position. Over most of the cycle (about 96%) the forces are those transmitted from the ancillary mass, through soft spring 8, and closely follow the rearward displacement of the ancillary mass 2. The rapid fluctuations of the force from plus-to-minus five pounds in the period between 52 and 57 ms are caused by the rapid, but small, variations in gun velocity during the period of contact between the ancillary mass 2 and stiff spring 4. These are transmitted to the gun mount 10 via the second damper 14, and, if desired, could be eliminated by using variable $d_1$ damping during this time period. Since these force oscillations are small, and occur during the period when other forces on the gun mount 10 are low, they can reasonably be allowed to occur and be neglected.

FIG. 7 also shows the achievement of one of the primary objectives of this invention—an input (driving) recoil force of 518 pounds occurring over three milliseconds (a unidirectional, shock-like force) has been reduced to an approximately sinusoidal force of magnitude not greater than 23.3 pounds, spread over 109 milliseconds, for transmission to the gun mount. and supporting structure. The maximum force has been reduced to less than five percent of the driving recoil force and the shock-like character of the driving force has been reduced by a factor of over thirty-six.

Figure 8:
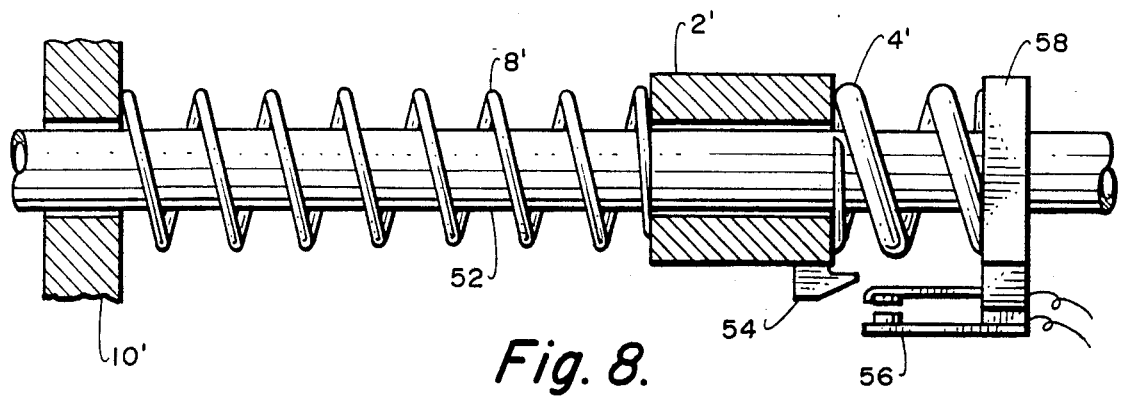
FIG. 8 is a side elevation view of an example embodiment of the invention and having the ancillary mass and the gun mount partly cut away. The figure shows the recoil mechanism at an at-rest position. This example involves just a simple helical compression spring beteeen the ancillary mass and the gun mount. The preferred embodiment of this invention uses the constant force spring mechanism of this invention in place of the helical compression spring.

FIG. 8 shows a preferred embodiment of the dynamic recoil damping device as applied to an M-60 machine gun and also shows the recoil system at rest with no stress or compression on either spring. In this example the dynamic recoil damping device is mounted on the barrel of the gun although this mounting scheme is not determinative of the invention. The shock absorber system is not shown in the figure.

Figure 9:
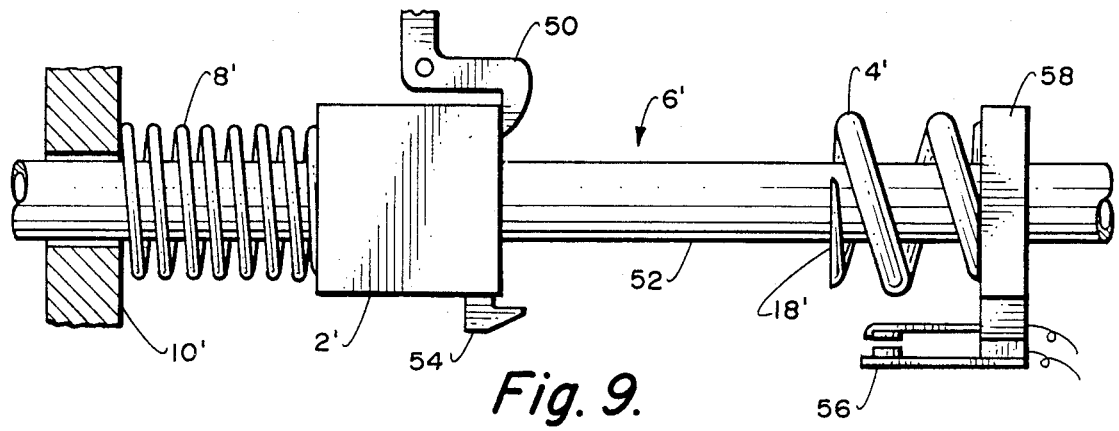
FIG. 9 is another sequence of FIG. 8, showing the recoil device in its cocked position and ready for firing.

FIG. 9 discloses the recoil system in the "cocked" position with the soft spring 8' compressed and the ancillary mass 2' held by a trigger latch 50.

In FIG. 8, the diameter of the machine gun barrel is 1.0 inches. The length of the ancillary mass 2' is 2.38 inches and the diameter of the ancillary mass is also 2.38 inches. The ancillary mass as disclosed is a cylindrical shape having a diametral hole having a diameter of 1.06 inches so that there is a slideable fit over the gun barrel 52, providing small damping. The length of the soft spring is 6.77 inches. The soft spring is permanently attached to the gun mount 10' and may be permanently attached to the ancillary mass 2', although the latter is not determinative of the invention. The stiff spring 4' is permanently attached only to the gun barrel, via flange 58. The gun barrel flange 58 has an electrical firing contact 56 attached to it. The bottom of the ancillary mass 2' has a projection 54 such that it will actuate the firing contact 56 when ancillary mass 2' reaches a specific location relative to stiff spring 4'.

The spring constants of the stiff and soft springs can be highly variable, depending upon the magnitude of the recoil driving force, the mass of the ancillary mass, the desired amount of displacement of the ancillary mass, and the time periods between rounds and of the recoil force. The ratio of the "stiff" and "soft" spring constants is approximately related to the square of the ratio of the time period between rounds and the duration of the recoil force. For a gun like the M-60, the time between rounds is about 109 milliseconds and the duration of the recoil force is about 3 milliseconds. Therefore, the "stiff" spring constant should be about 1320 times that of the "soft" spring.

In the preferred embodiment, spring constants of 2732 lb./inch and 5.514 lb./inch for the "stiff" and "soft" springs, respectively, were used for the dimensions previously recited. For a large, 30 MM gun, "stiff" and "soft" spring constants of 17,100 lb./inch and 33.3 lb./inch, respectively, can be used. For a typical machine gun, the "stiff" spring constant will usually be 400 to 2000 times larger than that of the "soft" spring.

FIG. 9 discloses the recoil system held in a "cocked" position by means of a trigger latch 50 holding the leading edge of the ancillary mass 2'. The lip of the leading edge of the ancillary mass 2' is 4.92 inches from the face of the gun mount 10' when it is in the "cocked" position.

When the trigger latch 50 is released or actuated by suitable means, the ancillary mass 2' is accelerated forward by the decompression of the compressed soft spring 8', until the projection 54 causes the electrical contacts 56 to make contact, causing the round to be fired. At that particular point, the stiff spring 4' has been compressed slightly by the momentum of the ancillary mass 2'. Upon discharge of the round (the rifle barrel 52 and flange 58 are part of the recoil mass 6) mass 6 will very rapidly press against the face of the ancillary mass 2'. During this interval the decelerating mass 2' has compressed spring 4' and has started to rebound. The stiff spring 4' will transfer the recoil force to the mass 2', thus minimizing motion of the gun mass 6 upon discharge of the round.

The gun barrel 52 is slideable on the gun mount to allow for some recoil movement of the barrel or gun mass. The stiff spring 4' does not have a transfer plate 18', as disclosed in FIG. 10, since the face of the spring 4' is cut flat and serves the dual function of a spring and a contact plate.

As previously stated, in order to set up the coordination of the oscillation of the recoil system with the discharge of the machine gun, it is better to start the system in the "cocked" position as shown in FIG. 9. When the trigger latch 50 is released, leased, causing the soft spring 8' to propel the ancillary mass 2' towards the stiff spring 4', the momentum of the ancillary mass 2' is such that when the bullet is discharged, the recoil force just neutralizes the reversal of momentum. As a result of this, the gun essentially remains motionless and all of the recoil force is transferred to the ancillary mass 2'. This recoil force is in turn transferred to the gun mount over the entire period between the discharge of the individual rounds. Since the period between rounds is usually thirty to forty times longer than the period of the recoil, the maximum loads transmitted to the gun mount could be reduced by as much as thirty to forty times. In addition, these loads are no longer shock-like in character.

The dynamic recoil attenuation mechanism just described involves the use of a conventional, helical coil compression spring between ancillary mass 2 and base or gun mount 10, as shown in FIG. 10. With such a spring, forces transmitted to the base or mount are greatly attenuated. Still, force is transmitted to the base or mount as a force varying as a half-sine wave over the time between the repetitive, shock-like driving forces. It would be ideal if the driving force could be transmitted to the base as a constant force over the full period between driving forces. This would entirely eliminate any shock-like character of the force transmitted to the base and would result in a minimum peak force or load being transmitted to the base. This can be accomplished if the soft spring means between ancillary mass 2 and the base or mount 10 is a constant-force spring or spring mechanism. Such a spring mechanism would transmit the same level of force to the base or mount regardless of the position of the ancillary mass.

The primary application for a constant force spring mechanism today is in pipe hangers. If a pipe is rigidly mounted and is subject to thermal expansion, the force between the pipe and the rigid mount can grow indefinitely even to collapse of the pipe or rupture of the mount. If the pipe is suspended by a conventional spring, excessive thermal growth can also give rise to excessive forces on pipe and mount. If the pipe weight is suspended on a constant force spring, then the pipe can freely expand and yet remain suspended with the force between the pipe and the support unchanged.

Most constant force springs available commercially today use a single spring built into a mechanism which changes the lever arm of the spring action. Over some portion of the spring-mechanism travel, the force exerted by the spring is approximately constant, independent of deflection. Usually such spring mechanisms are large and heavy and provide a constant force over a small range deflection. The spring mechanism that is the subject of this invention involves more than one spring, is small and light-weight and yields a force that is constant over the full range of deflection.

The primary application of the subject spring mechanism, however, is as part of the dynamic recoil damping mechanism of this invention, to reduce the maximum magnitude and eliminate the shock-like character of the forces transmitted to a rigid mount from a second mechanism which generates repetitive uni-directional shock loads. A dynamic mechanism has been described in which the recoil force is first transmitted to a moving ancillary mass, during the short period of the recoil force. The ancillary mass, mounted to a conventional coil spring, in turn transmits this force to the gun mount, but over the entire period between rounds. The integral of the force on the gun mount over the time between rounds is equal to the integral of the gun recoil force over the period of firing of the round. The maximum force on the mount, then, is much lower than the maximum recoil force and exhibits much less of a shock-like character.

One form of this mechanism involves a conventional coil spring connecting the ancillary mass to the gun mount. With this mechanism, the force transmitted to the mount is essentially a half sine-wave. The maximum force is transmitted to the mount midway between rounds. If the gun recoil, for example, were approximated by a force of 1000 pounds over 3 milliseconds, then the integral would be 3 pound-seconds. With 100 milliseconds between rounds the maximum force exerted against the mount, using the simple coil spring mechanism, would be only 47 pounds. This is not only an appreciable reduction in the maximum force exerted against the gun mount but the force is in the form of a smooth half sine-wave over the full 100 milliseconds, an appreciable reduction in the shock-like character of the force against the mount.

Ideally, however, the shock-like recoil force should be transmitted to the mount as a constant force over the full period between rounds. Not only would this yield the smallest possible maximum force on the gun mount but the force against the mount would essentially be a constant throughout the duration of the firing, no matter how may rounds were fired. In the example described above, the 1000 pound recoil force generated over 3 milliseconds, would be transmitted to the gun mount as a steady force of only 30 pounds as long as the gun was firing. This type of force would have no shock-like character at all. The key to such a dynamic recoil damping system is a constant force spring mechanism.

With a constant force spring mechanism connecting the ancillary mass of the co-pending application Ser. No. 367,509 with the gun mount, no matter where the ancillary mass is located during its travel between rounds, the force transmitted to the mount would be essentially constant. This is the primary application of the subject invention.

DESCRIPTION OF THE CONSTANT FORCE SPRING MECHANISM

A conventional coil spring loaded in compression generates a resisting force which is linearly proportional to compression of the spring, from the rest position:

$$F_c = K_c(X_o - X) \tag{3}$$

where:
  $F_c$ is the resistive force generated by compression of the spring,
  $(X_o - X)$ is the compression of the spring from rest $(X_o)$,
and
  $K_c$ is the spring constant, in units of force per unit of compression.

The subject invention includes one or more helical coil springs loaded only in compression.

A conventional coil spring loaded in tension also generates a resisting force which is linearly proportional to extension of the spring from the rest position. Helical extension springs, however, are often tightly wound such that a small initial force must be generated before the spring begins to extend. The force-extension characteristics can be accurately described by:

$$F_e = A + K_e(Y - Y_{so}) \tag{4}$$

where:
  $F_e$ is the resistive force generated by extension of the spring,
  $(Y - Y_{so})$ is the extension of the spring from rest $(Y_{so})$, $K_c$ is the spring constant, in units of force per unit of extension, and A is a constant expressing the initial force which must be overcome before the spring begins to extend.

Figure 11:
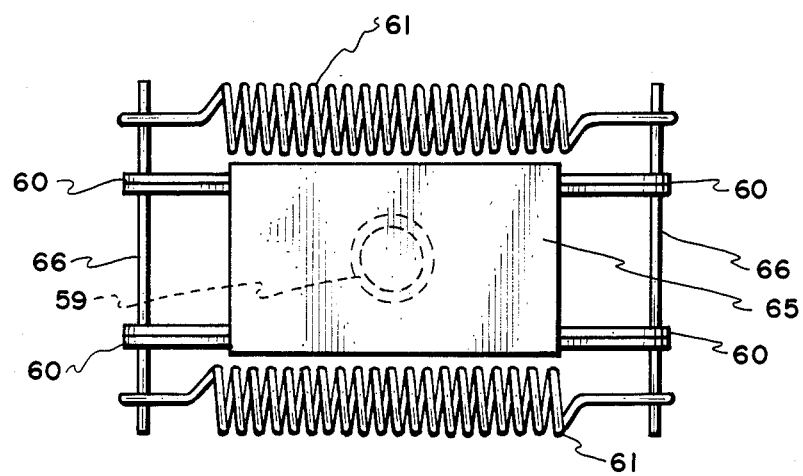
FIG. 11 is a top plan view of the Constant Spring Force Mechanism in a partially compressed position, illustrating the two extension springs, which replaces the single compression spring 8 shown in FIG. 10.
Figure 12:
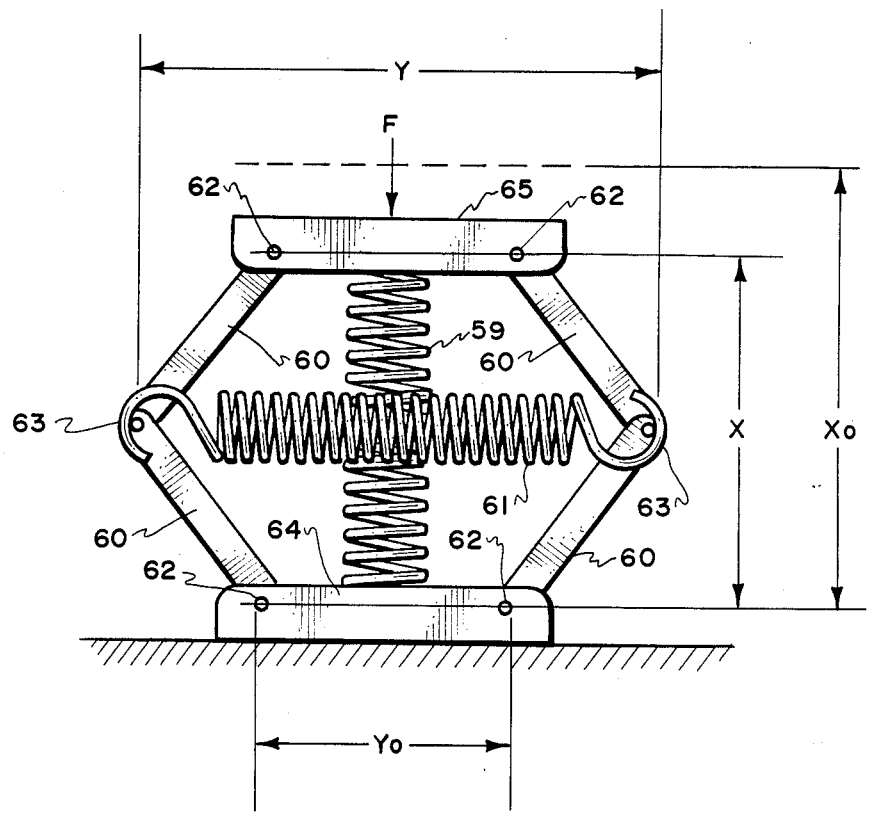
FIG. 12 is a side elevational view of the Constant Force Spring Mechanism in a partially compressed position, additionally showing the central compression spring.

FIGS. 11 and 12 show an example application of the subject invention. In this example, the subject mechanism surrounds a central coil compression spring means illustrated as a helical coil 59. There is disclosed four (4) articulated arms labeled 60 in the FIGS. 11 and 12. Each articulated arm means can be comprised of two rigid arms on opposite sides of a pivot for allowing the elbow-like action. They are placed in the position shown in FIG. 12 in opposed position for providing support between the two force plates 64 and 65. As illustrated, there are four (4) articulated arms 60 which are interconnected by an extension spring means for providing a resistance as the two (2) force plates 64 and 65 are pressed towards each other. The extension spring means are illustrated as a pair of helical coil extension springs 61 perpendicular to the central spring 59. The arms 60 are pivotally connected at their ends 62 and at the mid-points 63. Each of the articulated arms 60 is generally placed at each of the corners between the two (2) plates. Each articulated arm 60 is elbow shaped and jointed so that it can be pivotable outwardly away from the device. The two (2) rods 66 are passed through the elbows of the articulated arms 60 so that they act as a pivotal point for the articulated arms to pivot outwardly when force is applied between the force plates thereby compressing the central spring 59. These extension springs 61 provide a zero spring force when the articulated arms 61 are extended to the maximum, when there is a maximum distance between the two (2) force plates 64 and 65. The central spring and the articulated spring mechanism are connected at a force plate 64 and at a force plate 65.

Central spring 59 is a conventional spring, with a positive, linear spring constant, added to the articulated spring mechanism to create an overall spring mechanism in which the resistive force is independent of the degree of compression of the overall mechanism. The articulated mechanism is unique, however, and forms the basis of this invention. The unique feature of this articulated mechanism is that it provides a linear, negative spring constant. The resistive force generated by the articulated mechanism decreases linearly with compression. The articulated mechanism alone can be constructed with as little as two (2) articulated arms and one tension spring. When used in conjunction with a single central spring, to create the constant force mechanism, at least three articulated arms are necessary so that the tension springs operate outside of (and perpendicular to) the central compression spring. Alternatively, an articulated mechanism using just two (2) articulated arms could be used in conjunction with two (2) conventional compression springs operating in parallel outside of the articulated mechanism.

It can be shown, by simple trignometric relations, that as force plate 65 is forced toward mount 64 (compression) the articulated mechanism (alone) generates an axial resisting force on the force plate given by:

$$F_a = 2K_eX + 2\frac{A + K_e(Y_o - Y_{so})}{\left[\left(\frac{X_o}{X}\right)^2 - 1\right]^{\frac{1}{2}}} \quad (5)$$

Where:

$F_a$ is the axial resistive force generated by compression of the articulated mechanism alone $Y_o$ is the length of the extension springs when the overall mechanism is at rest and the rest of the symbols are as described earlier.

When the axial resistive forces generated on force plate 65 by the articulated mechanism are added to the parallel, axial resistive force generated by central spring 59, the resulting total resistive force developed by the overall mechanism is given by:

$$F = (2K_e - K_c)X + K_cX_o + 2\frac{A + K_e(Y_o - Y_{so})}{\left[\left(\frac{X_o}{X}\right)^2 - 1\right]^{\frac{1}{2}}} \quad (6)$$

If each of the two (2) extension springs are designed such that $$K_e = \tfrac{1}{2}K_c \quad (7)$$

and $$A + K_e(Y_o - Y_{so}) = 0 \quad (8)$$

then the total resistive force generated by the overall spring mechanism is:

$$F = K_cX_o \quad (9)$$

The design characteristic of equation (7) is easily met. The preferred design method to provide the design characteristic of equation (8) is to: (a) use extension springs which are not tightly wound, such that there is no residual force when the springs are at rest (constant A is equal to zero); and (b) use extension springs of length such that when the overall mechanism is fully extended, the length of the extension springs ($Y_o$) is equal to the extension spring rest length ($Y_{so}$) (there is no force remaining in the extension springs).

The extension springs and the spring mechanism can be designed with finite values for the constant A and for the spring rest position characteristic ($Y_o - Y_{so}$) as long as equation (8) is at least nearly satisfied. As shown in equation (5), as the articulated mechanism closely approaches full extension (X approaches $X_o$), the forces generated by the second term in equation (5) can approach very large values. In physical terms this means that as the articulated mechanism closely approaches the fully extended position the mechanism would tend to snap to the fully extended position unless the forces generated by the tension spring exactly approach zero as the mechanism approaches this fully extended position. Sensitivity of the overall mechanism to this phenomena can be reduced: (a) by limiting extension of the overall mechanism to, for example, 95 percent of full extension; or (b) providing a fine adjustment attachment at midpoints 63 of the articulated arms to adjust the extension spring length $Y_o$ to exactly fulfill the design requirement of equation (8).

With the design conditions of equations (7) and (8) satisfied, the overall spring mechanism exhibits the force-compression characteristic shown in equation (9). Since both the central spring constant, $K_c$, and the rest (fully extended) position of the overall mechanism, $X_o$, are constants, the overall mechanism generates a constant resistive force independent of the degree of compression. The contant force spring mechanism as disclosed in FIG. 11 shows force plates 64 and 65 with the central compression helical coil, spring 59 transversely interposed. This constant force spring mechanism is intended to replace the soft spring 8' shown in FIGS. 8 and 9. The at-rest position disclosed in FIG. 8 of the relatively soft spring 8 would be basically the same length as the positive compression helical coil spring 59 of the constant force spring mechanism. In practice, the spring mechanism shown in FIG. 12 would be rotated 90 degrees, as shown on the paper, and then fitted in place of the relatively soft spring 8, so that the recoil of the ancillary mass 2 would be absorbed by the constant force spring mechanism illustrated in FIGS. 11 and 12. In the block diagram, FIG. 10, the relatively soft spring 8 is replaced by the constant force spring mechanism disclosed in FIGS. 11 and 12.

In the combination of the constant force spring mechanism integrated with the dynamic recoil dampening mechanism, the relatively soft spring 8' could be considered the equivalent of the positive compression coil spring 59 with the added components of the two force plates and the four articulated arms and the two extension springs forming a housing around this relatively soft spring 8, such that the constant force spring mechanism provides more of a cushioning effect than the relatively soft helical coil 8 by itself.

EXPERIMENTAL EXAMPLE

The linear force-compression characteristics of helical, coil compression springs are well known. The primary unique characteristic of the subject invention is the inverse linear force-compression characteristic of the articulated spring mechanism. A number of special applications can make use of this characteristic alone. The example application described herein involves the use of the articulated mechanism in parallel with a conventional helical coil compression spring to yield an overall force-compression characteristic in which the resistive force generated by the overall mechanism is constant, independent of the degree of compression.

An articulated spring mechanism such as shown schematically in FIG. 11 was constructed. The compression-force characteristics of the articulated mechanism (negative spring), the conventional compression (positive) spring, and the overall constant force spring mechanism are shown in FIG. 13. Calibration of the two (2) transverse extension springs showed a spring constant, $K_e$, of 1.65 pounds of force per inch of extension. The lengths and winding conditions of these springs were such that the conditions of equation (8) were nearly met. FIG. 13, then, shows that the compression-force characteristics of the articulated mechanism alone, with only these extension springs attached, are those of a negative spring. The resistive force varies nearly linearly from a maximum of about 15 pounds at 0.5 inches of compression to about 3 pounds at 4 inches of compression.

According to analysis of the overall spring mechanism, as shown in equation (7), a central conventional compression spring with a spring constant of 3.3 pounds per inch of compression should be used with the above negative spring mechanism to yield an overall constant force spring mechanism. Of the available springs, the closest showed a spring constant of 3.9 pounds per inch of compression. This positive spring was not exactly correct for the negative spring. It was expected, therefor, that the resulting force of the overall spring mechanism would not be exactly constant. However, the match was considered sufficiently close to demonstrate the concept. To compensate somewhat for the small spring constant mismatch, the conventional compression spring was displaced 0.26 inches relative to the negative spring, so that compression forces from that spring would not begin to be generated until the overall mechanism was compressed 0.26 inches. FIG. 12 shows the resulting compression-force characteristics of the central helical coil spring alone. The resistive force varies linearly from zero at 0.26 inches of compression to 14.6 pounds at 4 inches of compression.

The data shown in FIG. 13 for the negative spring were obtained with the central helical coil spring removed from the spring mechanism. Similarly, the data shown for the positive spring were obtained with the transverse extension springs removed from the mechanism. Data for the total spring mechanism, with all springs in place, are also shown in FIG. 13. As expected, the compression-force characteristics are not exactly independent of compression, because of the larger than desired spring constant of the conventional compression spring (or the smaller than desired constant of the extension springs). This is shown in FIG. 13 by the linearly increasing force from about 16 pounds at 0.5 inches of compression to about 18.7 pounds at 3.5 inches of compression. Nevertheless, while the negative and positive springs alone generate resistive forces varying over the range of zero to about 15 pounds, as a result of 3.5 inches of compression, the resistive force of the total spring mechanism varies only over the range of about 15.1 to 18.8 pounds over the same range of compression. In effect the constant force spring mechanism shows a constant average force of 17.7±1.1 pounds over the full range of compression.

FIG. 13 shows that the measured forces of the total spring mechanism were somewhat higher than the direct sum of the individually measured forces from the negative and positive springs (the dashed line in FIG. 13). This is thought to result from stiffening of the spring mechanism with all springs attached. FIG. 13 also shows that the conditions of equation (8) were not exactly met with the transverse extension springs. The resistive force of both the negative and the total spring mechanism rise rather sharply as the amount of compression approaches zero. This is predicted by equation (6), when the conditions of equation (8) are not met.

The experiment described is considered to adequately demonstrate all of the characteristics predicted by equations (3) through (9). With greater care in the design of the spring and mechanism characteristics and/or through the use of fine tuning adjustments in the mechanism, the resulting resistive forces generated by the overall mechanism can be made truly independent of the degree of compression.

While the present invention has been shown and described herein in what is conceived to be the best mode contemplated, it is recognized that departures may be made therefrom within the scope of the invention which is therefore not to be limited to the details disclosed herein, but is to be afforded the full scope of the invention.

What is claimed is:

1. A constant force spring mechanism comprising:
   four articulated arms, each said arm comprising an upper link and a lower link, said links being connected at one of their ends forming an outwardly moving joint at the midway point of each said articulated arm;

a rectangular upper force plate and a retangular lower force plate opposed in parallel and transversely to said articulated arms;

each said articulated arm connecting an upper corner and lower corner of said force plates;

each said corner connection being a pivotal connetion;

a first helical extension spring connected parallel to said force plates and attached to the midway joints of said two opposed articulated arms on one side of said force plates for providing resistance to the compression when said force plates are pressed toward each other;

a second extension spring connected parallel to said force plates and attached to the midway joints of said other two opposed articulated arms on said other opposite side of said force plates for providing resistance to the compression when said force plates are pressed toward each other;

a positive helical compression spring positioned centrally and transversely between said force plates and perpendicular to said first and second extension helical springs;

means for connecting said positive helical compression spring to one of said force plates, leaving the other end abutting, but unconnected, to said other force plate;

said positive compression spring having an at-rest length sufficient to maintain a resistance to compressibility of the force plates when the spring mechanism is not in an at-rest position;

compression spring rates such that the positive spring rate of said positive compression spring is equal to the negative spring rate of the spring mechanism, such that resistance to compression of the spring mechanism is approximately independent of the degree to which said force plates are compressed toward each other.

2. The constant force spring mechanism as recited in claim 1 wherein:

different extension and compression spring rates having any serial combination of one negative and one positive spring rate resulting in a constant force spring mechanism as said force plates are compressed toward each other.

* * * * *